Sept. 3, 1968  J. A. STAFFORD  3,399,616
FILM PROCESSOR FOR RECORDERS
Original Filed Aug. 4, 1966  3 Sheets-Sheet 1
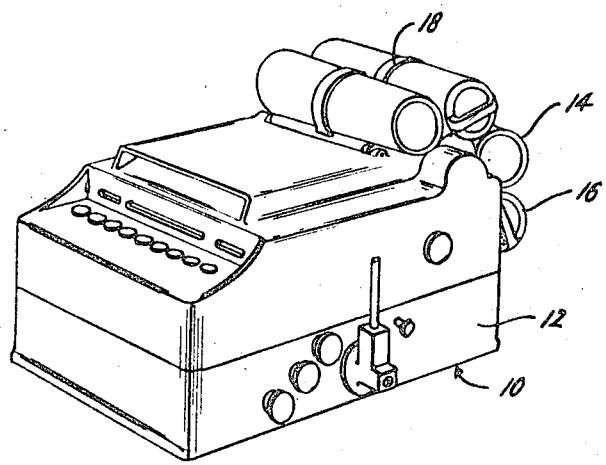
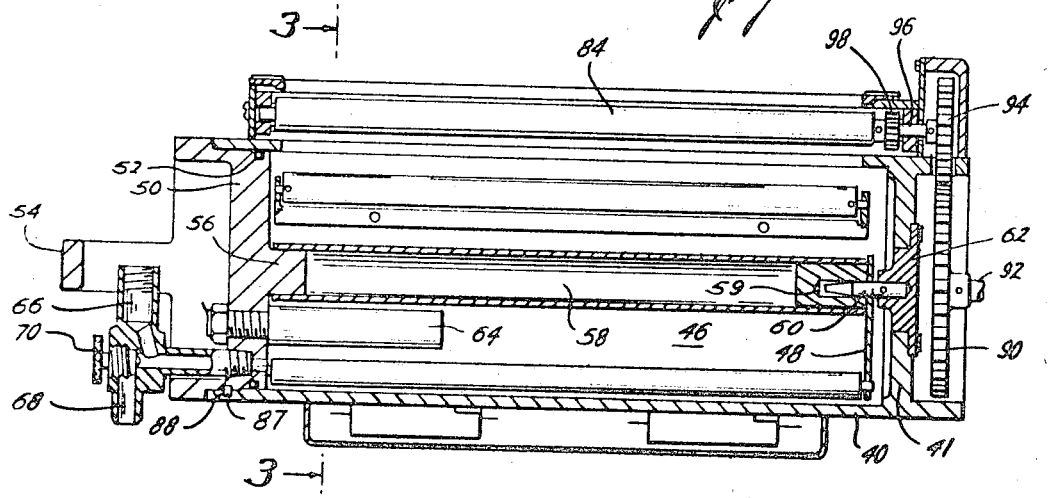
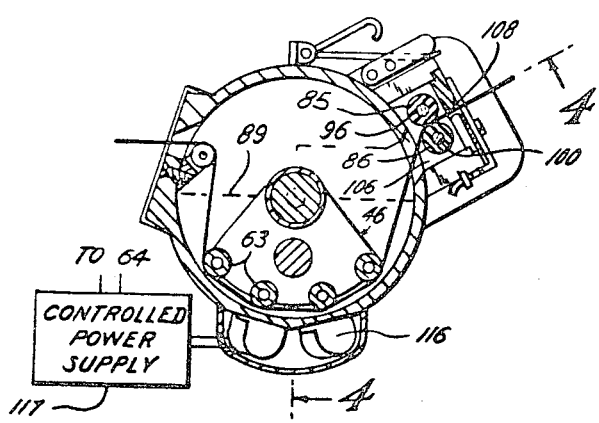
John A. Stafford
INVENTOR.
BY David L. Moseley
ATTORNEY Sept. 3, 1968

J. A. STAFFORD 3,399,616

FILM PROCESSOR FOR RECORDERS

Original Filed Aug. 4, 1966

John A. Stafford
INVENTOR.

BY David L. Moseley

ATTORNEY

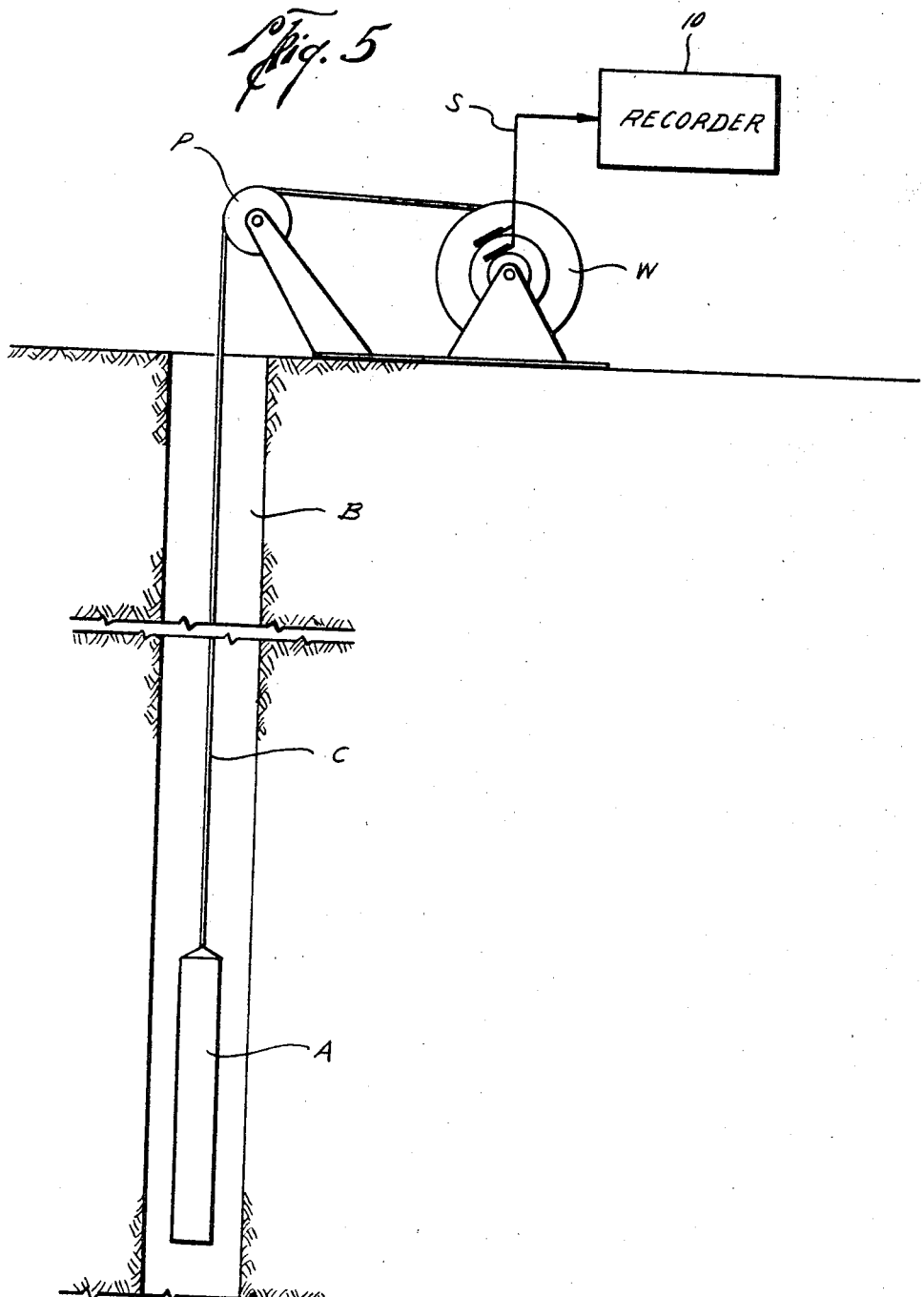

United States Patent Office 3,399,616
Patented Sept. 3, 1968

3,399,616
FILM PROCESSOR FOR RECORDERS
John A. Stafford, Houston, Tex., assignor to Schlumberger Technology Corporation, Houston, Tex., a corporation of Texas
Application Aug. 4, 1966, Ser. No. 573,753, which is a continuation-in-part of application Ser. No. 481,626, Aug. 23, 1965. Divided and this application Apr. 14, 1967, Ser. No. 630,865
6 Claims. (Cl. 95—94)

ABSTRACT OF THE DISCLOSURE

A processing attachment for recorders used in well logging includes a cylindrical container having lengthwise extending ingress and egress openings disposed on one side of the central axis of the container. A roller guide assembly is mounted in the container on a removable end wall thereof and has guide rollers disposed lengthwise of the container on the opposite side of the central axis of the container. The container is fluid-tight for containing a developing fluid above the rollers but below the openings, and a drive mechanism is mounted adjacent the egress opening and adapted to move film through the fluid at variable speeds as determined by a well logging operation.

---

Figure 2:
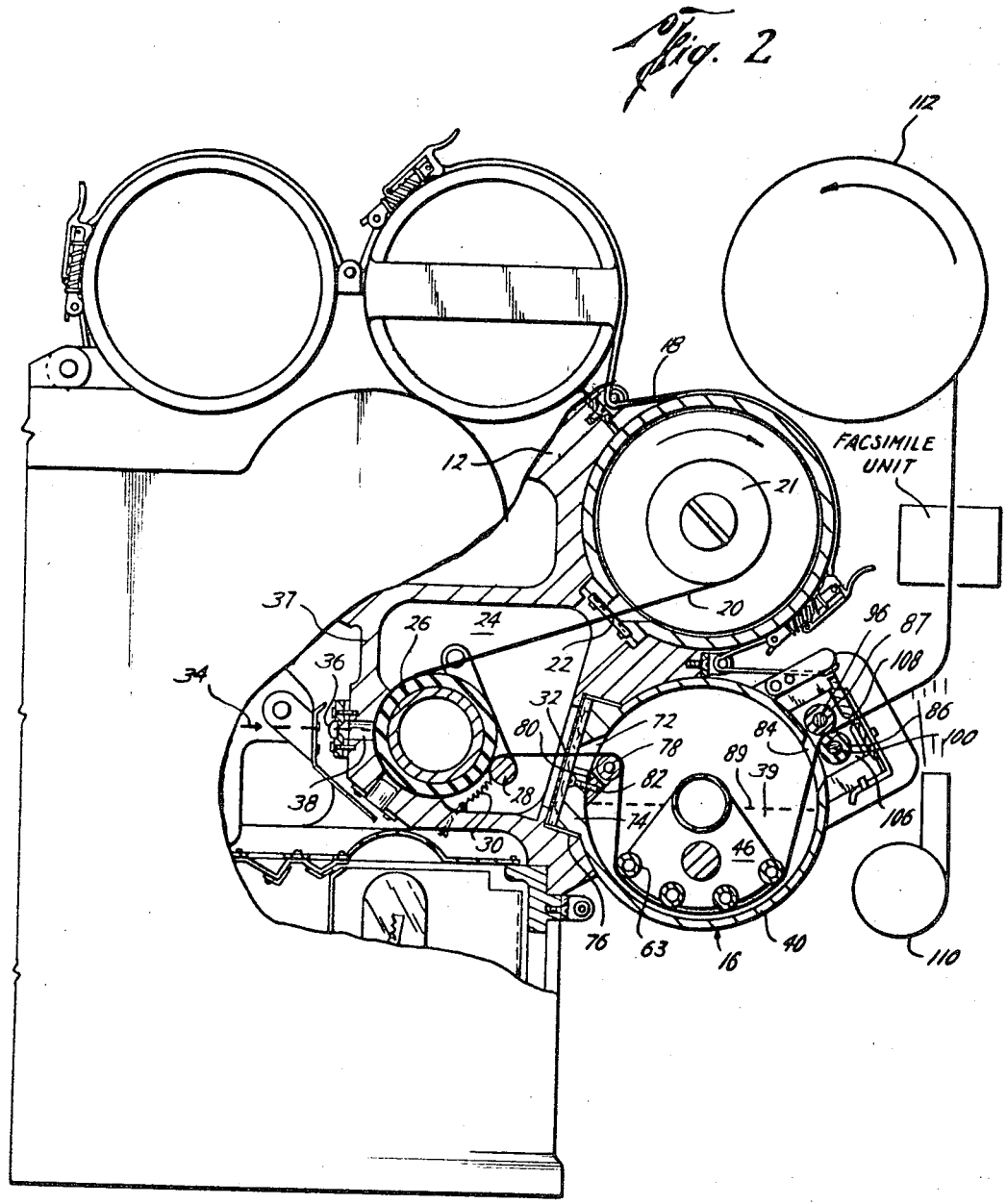

This application is a division of application Ser. No. 573,753, filed Aug. 4, 1966, which application is a continuation-in-part of application Ser. No. 481,626, filed Aug. 23, 1965, now abandoned.

This invention relates to well logging and, more particularly, to apparatus for processing data in connection with well logging where logs or charts are produced having visible traces representative of characteristic properties of earth formations.

In well logging, a sensing instrument or sonde suspended on an armored electrical cable traverses a well bore extending through earth formations. Electrical signals are produced which are representative of various characteristic properties of the earth formations and the signals are fed into a recorder usually located on a special vehicle or truck at the earth's surface. The recorder is typically of the mirror galvanometer type which operates to electromechanically transduce the electrical signals into mechanical rotational energy used to move one or more light beams. The light beams are exposed on a photosensitive film or chart which is moved responsive to movements of the sonde in the well bore in a manner whereby the aforementioned characteristic properties are correlated with depth below the earth's surface.

The light beams, as they impinge upon the photosensitive film, form latent images or traces thereon. Typically, after the logging operation is completed, the exposed film is removed from the recorder for conventional wet processing in photographic baths located in special dark room facilities on the vehicle or truck.

In many applications, for example, in offshore oil prospecting or in swampy or otherwise inaccessible areas, it is desirable to be able to read out the information from the film while it is being recorded. Earliest availability of the recorded logs allows time and money-saving decisions with respect to further logging, testing or completion operations in the well. Moreover, it would be desirable to eliminate the need for using special dark room or developing facilities on the vehicle or truck to eliminate the inherent complexities involved, to save total time required to complete a logging service, and to conserve space normally occupied by the dark room facilities inside the special vehicle or truck.

Accordingly, an object of the present invention is to provide a new and improved apparatus for data processing in well logging.

Another object of this invention is to provide a new and improved apparatus for data processing in well logging wherein optical read out of the recorded logs is available to an operator contemporaneously with the recording of the information on the charts or films.

Another object of this invention is to provide a new and improved well logging recorder which includes a processor for processing an exposed portion of the film or chart while it is continuing to be exposed at the recorder's normal speeds.

Generally described, these and other objects are attained in accordance with the present invention by providing a film processing apparatus which can be conveniently attached to a recorder housing. The apparatus includes a generally cylindrical container having lengthwise extending ingress and egress openings disposed to one side of the central axis of the container. A roller assembly is pivotally mounted in the container and has roller means disposed lengthwise of the container on the opposite side of the central axis of the container. The container is arranged to be fluid-tight for containing a film developing and fixing fluid above the roller means but below the ingress and egress openings. A shoulder means extends outwardly from the exterior of the container adjacent to the ingress opening for cooperably positioning the container on the recorder housing.

The novel features of the present invention are recited with particularity in the appended claims. The invention may be best understood from the following description when taken in conjunction with the accompanying drawings in which:

FIGURE 1 is a perspective view of the improved logging recorder in accordance with this invention;
FIGURE 2 is a partial side view, partly in section, of the recorder of FIGURE 1;
FIGURE 3 is a sectional view of the film processor;
FIGURE 4 is a sectional view taken along line 4—4 on the processor of FIGURE 3; and
FIGURE 5 is a schematic view of surface equipment and of a sonde suspended on a cable in a well bore.

As will be familiar to those persons skilled in the art of well logging, a logging instrument or sonde can be suspended within a well bore on a cable containing one or more conductors through which electrical signals can be transmitted to the surface. The instrument may be any of the conventional geophysical exploration instruments commonly used in the art, for example, a resistivity measuring instrument as shown in U.S. Patent No. 2,712,629 or a radioactivity logging tool as shown in U.S. Patent No. 2,349,225. All such instruments make a series of measurements in the well bore to provide a parameter related to the characteristics of earth formations surrounding the well bore.

Referring to FIGURE 5, the cable C can be passed over a logging pulley P and be wound on a winch W for taking up and paying out the cable to move the logging apparatus A through the well bore B in a well known manner. The winch W can be mounted on a special truck or vehicle (not shown) which is particularly adapted for well logging operations or can be mounted on a special chassis for offshore oil prospecting. In any event, a recorder 10 as shown in FIGURES 1 and 5 has inputs suitably connected, for example, by a slip ring and brush assembly S on the winch W, to the various electrical conductors in the cable so that the electrical signals representative of various characteristic properties of the earth formations are fed into the recorder 10.

The recorder 10 may be an oscillating galvanometer recorder of the type described in U.S. Patent No. 3,181,-

056, which operates to electromechanically transduce the electrical signals into mechanical rotational energy and then to ulitize the rotational energy to move at least one light beam. The light beams are exposed on a photosensitive film or chart in a manner to be described in more detail hereafter.

A nine-galvanometer logging recorder 10 of the type described is shown in FIGURE 1. Certain control knobs and other devices are shown on the recorder, but inasmuch as they form no part of this invention, a description thereof is believed unnecessary. That portion of the recorder which illustrates the apparatus of the present invention is shown in greater detail in FIGURES 2–4.

The recorder 10 has a housing 12 on which is mounted a magazine 14 and a processor 16, both detachably secured to the casing 12 by a clamp 18. The magazine 14 houses a suitable roll of photographic film or chart 20 on a supply spool 21. The film is dispensed through a light-tight, felt-lined slit 22 into a dark chamber 24 in the recorder's housing 12. In the chamber 24, the film is made to pass over a rubber roller 26. Pressure is maintained continuously on the film by a pivotally mounted pressure roller 28 secured to a tension spring 30. The film 20 exits from chamber 24 through a felt-lined slit 32.

At least one movable beam of light 34, representing the characteristic property being measured as previously described, is focused onto the photographic film 20 by a lens system 36 which is fixedly secured to the outer wall 37 of the chamber 24. After being converged by the optical lens system 36, the beam 34 passes through an opening 38 in the wall 37 to be exposed on the film 20 and form a latent image thereon. The latent image is rendered permanently visible by a processing action which takes place in the processor 16.

The processor 16 has a cylindrical tank or container 40 having an end wall 41. The other end of the container is open to receive a roller assembly generally designated as 46 (see FIGURES 3 and 4). This assembly includes an end support plate 48 and a support cover plate 50 which fits snugly into the open end of the tank 40. An O-ring 52 on the plate 50 makes the processor 16 fluid-tight when the assembly 46 is inserted therein. The assembly 46 may be held by a handle 54 fixedly secured to the plate 50.

Centrally mounted on a projection 56, extending from the plate 50, is a cylindrical tube 58. The outer end of the tube 58 carries a sleeve bearing 59 for receiving a pin 60 carried by a plate 62 centrally mounted in the end wall 41. Thus, when the assembly 46 is fully inserted into the tank 40, the pin 60 rotatably supports the tube 58. A number of cylindrical guiding rollers 63 (FIGURE 3) are rotatably mounted between the cover plate 50 and the support plate 48. A typical thermostat 64 is bolted to the inner wall of plate 50. When the assembly 46 is snugly inserted into the container 40, a monobath film developing solution can be poured into the processor 16 through an opening 66. The solution can also be drained out of the processor via a vent hole 68 which is normally closed by a plug 70.

As shown in FIGURE 2, the film 20 from the dark chamber 24 enters through a slit 32 into an opposite opening 72 formed in a rectangularly shaped guiding and positioning flange 74 projecting from the periphery of the container 40. The flange 74 fits snugly in a generally rectangularly shaped recess 76 formed on the outer periphery of the recorder housing 12. A roller 78 rotatably mounted on an arm 80, secured to the shoulder 74 by a screw 82, guides the film 20 into the processor 16. Then the film passes under the four rollers 63 and exits through an opening 84 in the container 40.

The insertion of the film 20 into the processor 16 can be facilitated by first entering the film into the processor through the opening 72 and pulling it out through the opening 84. Next the roller assembly 46 can be inserted into the processor 16 so that the rollers 63 occupy a position substantially diametrically opposite to the position shown in FIGURE 3. With the aid of the handle 54, the assembly 46 can then be rotated so that it occupies the position shown in FIGURE 3. The rotation and proper positioning of the assembly 46 is facilitated by a guide pin 87 on the plate 50 which slides in a groove 88 in the inner wall of the container 40.

Various means may be used to pull the film out from the processor 16 so that the velocity of film movement is determined by the logging operation and the film will be moved relative to the movements of the light beam 34 in a manner to correlate with depth in the well bore. In the preferred embodiment, the recorder 10, which can be driven by mechanical or electromechanical means connected to a pulley over which the cable passes, drives a gear 90 fixedly mounted on one end of a shaft 92. Gear 90 is meshed with another gear 94 fixedly mounted on one end of a shaft 96 to which is also secured a gear 98. Gear 98 is meshed with another gear (not shown) on shaft 100. The shafts 96 and 100 respectively support rollers 85 and 86. The rollers 85 and 86 are housed in a chamber 106 provided with a felt-lined exit slit 108. A pickup spool 112, driven by any suitable means (not shown) is provided for collecting the film 20. During the film's trajectory between the chamber 106 and the spool 112, the developed film having a permanent trace thereon may be immediately viewed by an operator or scanned by a photoelectric read out device such as may be incorporated in a facsimile transmitting unit 115.

A fan 110, or other drying means such as electrical heating elements, may be provided to dry the film 20 immediately after the film's egress from the chamber 106. For best results, it is desired to maintain the temperature of the monobath 39 at a predetermined level. This is achieved by providing a heating means such as resistors 116, mounted on the outer wall of the processor 16, the resistors being energized by a source 117 which is controlled by the thermostat 64. If desired, a developing fluid circulating system (not shown) may be utilized to continuously circulate the fluid through the container 40 to prevent collection of precipitated materials at the bottom portion of the container.

The displacement of the film 20 through the recorder 10 may vary, for example, from 0 to 10″ per second and, consequently, the monobath must be of such a chemical composition as to accommodate such displacements and to make visible, permanent traces on the film in the processor 16. It is preferred that the emulsion on the film and the monobath solution, containing both developing and fixing ingredients, be compatible. Both the film and the monobath solution are commercially available from the Eastman Kodak Company. One such solution is sold under the designation MX–448. It will, therefore, be appreciated that, in accordance with this invention, the improved recorder 10 allows an observer to view the processed film 20 immediately after the film is exposed in the chamber 24 to the image beam 34. Alternatively, the log on the processed film may be transmitted to a remote receiving station, e.g., on shore, by facsimile transmission for convenient analysis contemporaneously with running of the logging apparatus in a well.

In operation, the film 20 on the supply spool 21 is fed through the slit 22, around the rubber roller 26 and over the pressure roller 28, and out the slit 32. The end of the film 20 is then fed through the container 40 via the ingress port 72 and the egress port 84, between the drive rollers 85, 86, and out the slit 108, and to the take-up spool 112. The container 40 is then attached to the housing 12 of the recorder 10 by positioning the guide flange 74 within the housing recess 76 and operating the clamps 18.

The roller assembly 46 is inserted into the tank 40 with the rollers 63 occupying a position diametrically opposite to their positions as shown in FIGURE 3, and then the entire assembly rotated a half-turn to the position shown in FIGURE 3. The guide pin 87 insures that the assembly 46 is properly oriented to guide the film 20 along the lower wall surface of the container 40. Then the monobath solution 39 can be poured into the opening 66 up to a predetermined level as indicated by the dashed line 89 in FIGURE 3.

The well is then logged and characteristic properties of the earth formations traversed by the well bore are detected and repetitively measured by using a logging apparatus A or other geophysical exploration device. As previously mentioned, the apparatus A can be suspended in the well bore on an electrical cable C through which signals representative of the measured characteristic properties can pass for detection at the earth's surface. The apparatus A is moved along the well bore B as characteristic properties of the earth formations are repetitively measured and the measured characteristics are correlated with depth in the well bore.

At the earth's surface, the electrical signals are fed into the recorder 10 and utilized to control light beam movements as the light beams are exposed on the photosensitive film 20. The drive rollers 85, 86 are suitably connected to a pulley over which the cable passes as previously described so as to cause the film 20 to move over distances proportional to the distances between measured characteristics in the well bore. Thus, it will be appreciated that the latent images formed on the film 20 provide a record of the quantity of measured property as well as its depth below the earth's surface.

As the film 20 is exposed to the light beam 34, it is moved through the processor tank 40 between the guide rollers 63 and the bottom portion of the tank. The monobath solution 39 acts to substantially simultaneously develop and fix the exposed film 20 to provide a permanent trace thereon contemporaneously with continued exposure of the film. For optimum results, the temperature of the monobath solution 39 is maintained at a substantially constant value by heat from the resistors 116 as controlled by the thermostat 64. As the film 20 is transported out of the slit 108, it is made immediately available for visual observation by an operator. The film is then taken up and stored on the take-up spool 112. Preferably, the drying means 110 is operated for drying the film 20 as it passes between the processor 16 and the take-up spool 112.

A new and improved data processing apparatus has been disclosed for use in well logging. The read out of the recorded log from a recorder is available to an operator contemporaneously with recording on a photosensitive film and while the film is continuing to be exposed at speeds imposed by normal well logging operations. Since certain changes may be made by those persons having ordinary skill in the art without departing from the inventive concepts involved, it is intended that the appended claims cover such changes as shall fall within the true spirit of the invention.

I claim:

1. A processor for use with a well logging recorder comprising: a cylindrical container having an end wall closing one end thereof and being open at the other end thereof; a roller assembly insertable into said container from said open end, said assembly having a wall portion for closing said other end of said container, said roller assembly further having a central shaft defining an axis about which said assembly can be pivoted; means on said end wall engageable with said shaft for pivotally supporting said shaft; ingress and egress means in the walls of said container through which a strip of film can be transported for movement through said container; and means adjacent said ingress means for attaching said container to a recorder.

2. A processor as recited in claim 1 wherein said attaching means comprises shoulder means on the exterior surface of said container, said shoulder means being adapted for engagement within a companion recess in a recorder; and clamp means for firmly clamping said container to a recorder.

3. A film developing attachment for recorders comprising: a generally cylindrical container means having a closed end and an open end; ingress and egress openings through the walls of said container means adapted for passing a strip of film; a film guiding assembly insertable into said container means, said assembly including a wall portion for closing said open end when said assembly is positioned within said container means, said assembly including roller means for guiding said film along the lower portion of said container means between said ingress and egress openings, said assembly being pivotally mounted in said container means; means on the exterior of said container means adjacent said ingress opening for attaching said container means to a recorder; and means adjacent said egress opening for moving said film at variable speeds through said container means.

4. A film processor adapted to be attached to a recorder, comprising: an elongated container having a closed end and an open end; a roller guide assembly insertable into said container and having a wall portion closing the said open end of said container, said wall portion and guide assembly being rotatably mounted on said container; and ingress and egress openings in said container for passing a strip of film through said container, said guide assembly including roller means which can be disposed by rotation of said wall portion and guide assembly to a position causing the film to follow a curved path through said container.

5. The film processor of claim 4 further including means surrounding said ingress opening for fitting said container on a recorder.

6. The film processor of claim 4 further including means adjacent said egress opening for pulling film through the processor at variable speeds.

References Cited

UNITED STATES PATENTS

| | | | |
|---|---|---|---|
| 2,263,380 | 11/1941 | Coleman | 95—94 |
| 2,492,133 | 12/1949 | Cobb | 95—94 |
| 2,688,281 | 9/1954 | Bornemann | 95—89 |
| 3,277,808 | 10/1966 | Frohock | 95—89 |

NORTON ANSHER, *Primary Examiner.*

FRED L. BRAUN, *Assistant Examiner.*